(12) United States Patent
Elstermann

(10) Patent No.: US 9,197,947 B2
(45) Date of Patent: Nov. 24, 2015

(54) DEVICES AND METHODS FOR DYNAMIC VIDEO PROCESSING

(71) Applicant: General Instrument Corporation, Horsham, PA (US)

(72) Inventor: Erik Elstermann, Carlsbad, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 13/830,558

(22) Filed: Mar. 14, 2013

(65) Prior Publication Data
US 2014/0282736 A1    Sep. 18, 2014

(51) Int. Cl.
*G06F 3/00* (2006.01)
*G06F 13/00* (2006.01)
*H04N 5/445* (2011.01)
*H04N 21/84* (2011.01)
*H04N 21/482* (2011.01)
*H04N 21/2668* (2011.01)

(52) U.S. Cl.
CPC ........... *H04N 21/84* (2013.01); *H04N 21/2668* (2013.01); *H04N 21/4821* (2013.01)

(58) Field of Classification Search
USPC .......................... 725/50, 103, 114; 375/240.1
See application file for complete search history.

(56) References Cited

U.S. PATENT DOCUMENTS

| | | | |
|---|---|---|---|
| 7,650,620 B2 * | 1/2010 | Fish et al. ........................ | 725/66 |
| 7,900,231 B2 * | 3/2011 | Paxton et al. .................... | 725/93 |
| 2004/0240541 A1 * | 12/2004 | Chadwick et al. ........ | 375/240.01 |
| 2005/0251488 A1 * | 11/2005 | Saunders et al. ................ | 705/59 |
| 2006/0135131 A1 * | 6/2006 | White ......................... | 455/412.1 |
| 2009/0092183 A1 * | 4/2009 | O'Hern ..................... | 375/240.01 |
| 2011/0292189 A1 * | 12/2011 | Newton et al. ................... | 348/51 |
| 2013/0324228 A1 * | 12/2013 | Barber ............................ | 463/25 |
| 2014/0038514 A1 * | 2/2014 | Robbins ........................... | 455/3.06 |
| 2014/0089989 A1 * | 3/2014 | Farb et al. ....................... | 725/60 |

* cited by examiner

*Primary Examiner* — Nnenna Ekpo
(74) *Attorney, Agent, or Firm* — Thomas A. Ward

(57) ABSTRACT

In one embodiment, a method of providing preset video processor configuration information in a video program stream is disclosed, the method including: identifying event boundaries of a video program; classifying the video program as an event type based on program title; selecting a preset from a list of at least two video processor configuration information presets for the event type; and delivering the program stream to one or more subscribers.

18 Claims, 9 Drawing Sheets

US 9,197,947 B2

1

DEVICES AND METHODS FOR DYNAMIC VIDEO PROCESSING

FIELD

The present disclosure relates generally to video processing and specifically to an improved system, device and method for modifying video processing parameters in near real-time.

BACKGROUND

The task of producing a broadcast program is a complicated, time-consuming and error-prone job. Traditionally, a programmer (which is understood by one skilled in the art to be a person who schedules and distributes broadcast content, in contrast to a computer programmer who writes code) assigns a broadcast program (a broadcast event) to a time slot and ensures that other events, including interstitial and commercial events, are available to be inserted into the output stream when a cue tone, or equivalent signal, is detected. If the programmer desires to add other types of information, such as multimedia data, the programming is complicated even further.

In a digital broadcast system, the programmer schedules the time that content is to play for a specific event, where the media resides, what media server should play it and how to control the media server. This information often resides in one or more databases, which can be, for instance, flat-file, relational or object-oriented databases. The typical broadcast scheduler would continuously examine the database and, at the scheduled time, the broadcast scheduler would control the appropriate media server to play the desired broadcast event. For live-event contents such as sportscasts, the schedule is subject to change (e.g., due to rain delay) and some manual intervention may be necessary to adjust schedules in real-time as specified by a director or producer. Broadcast schedules may also be supplied to electronic program guide ("EPG") systems for consumer use, including real-time channel selection and digital video recorder ("DVR") configuration.

As broadcasting information becomes more and more sophisticated, so are techniques needed that simplify and/or reduce the amount of effort provided by broadcast hardware and programmers. Additionally, because scheduled content may include varying types and genres of content, systems and methods for optimizing the content based on type or genre would be desirable.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

2

Figure 5:
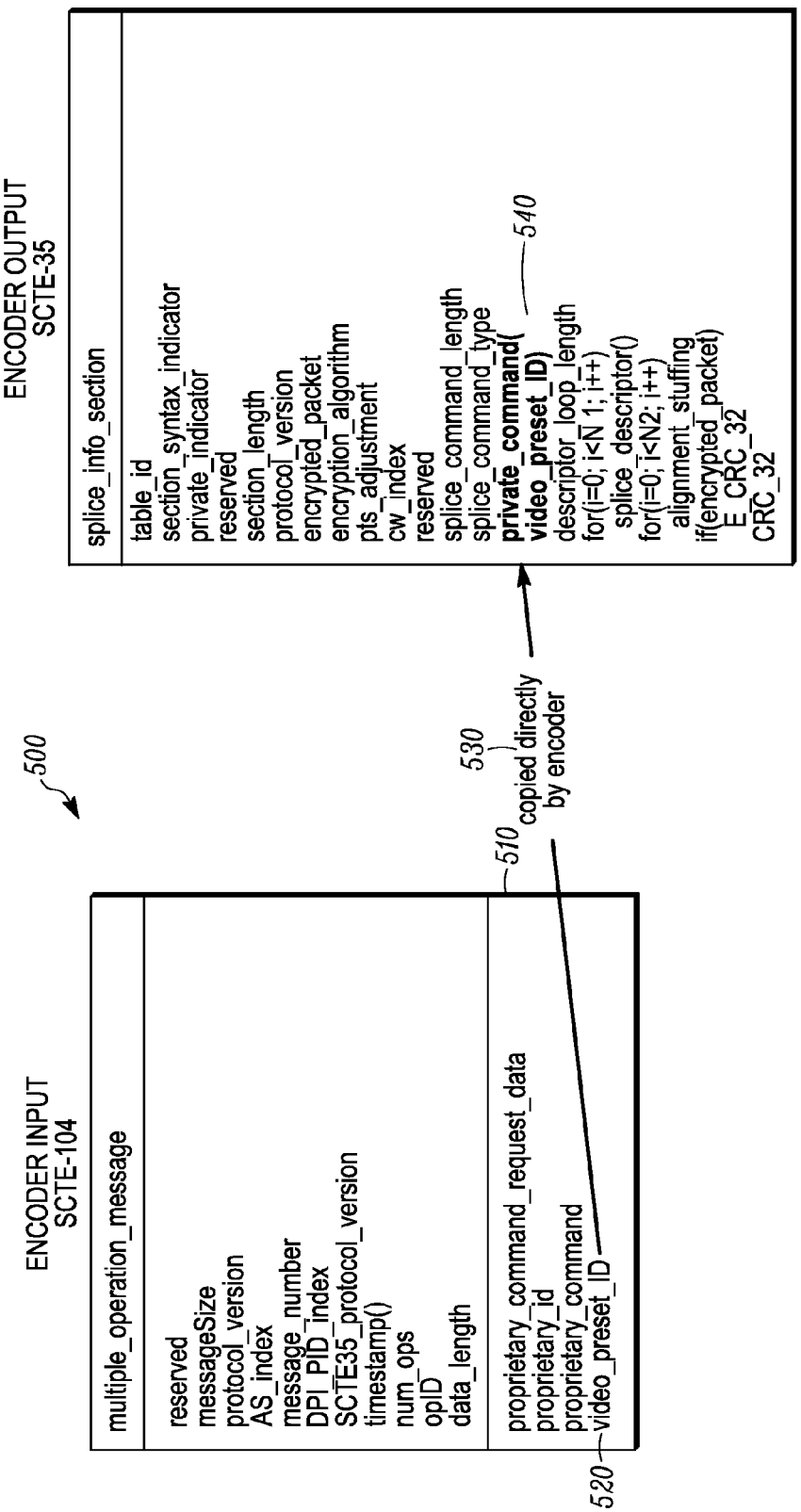

FIG. 5 is an example message format for in-band signaling using SCTE-104 in accordance with embodiments of the disclosure.

Figure 1:
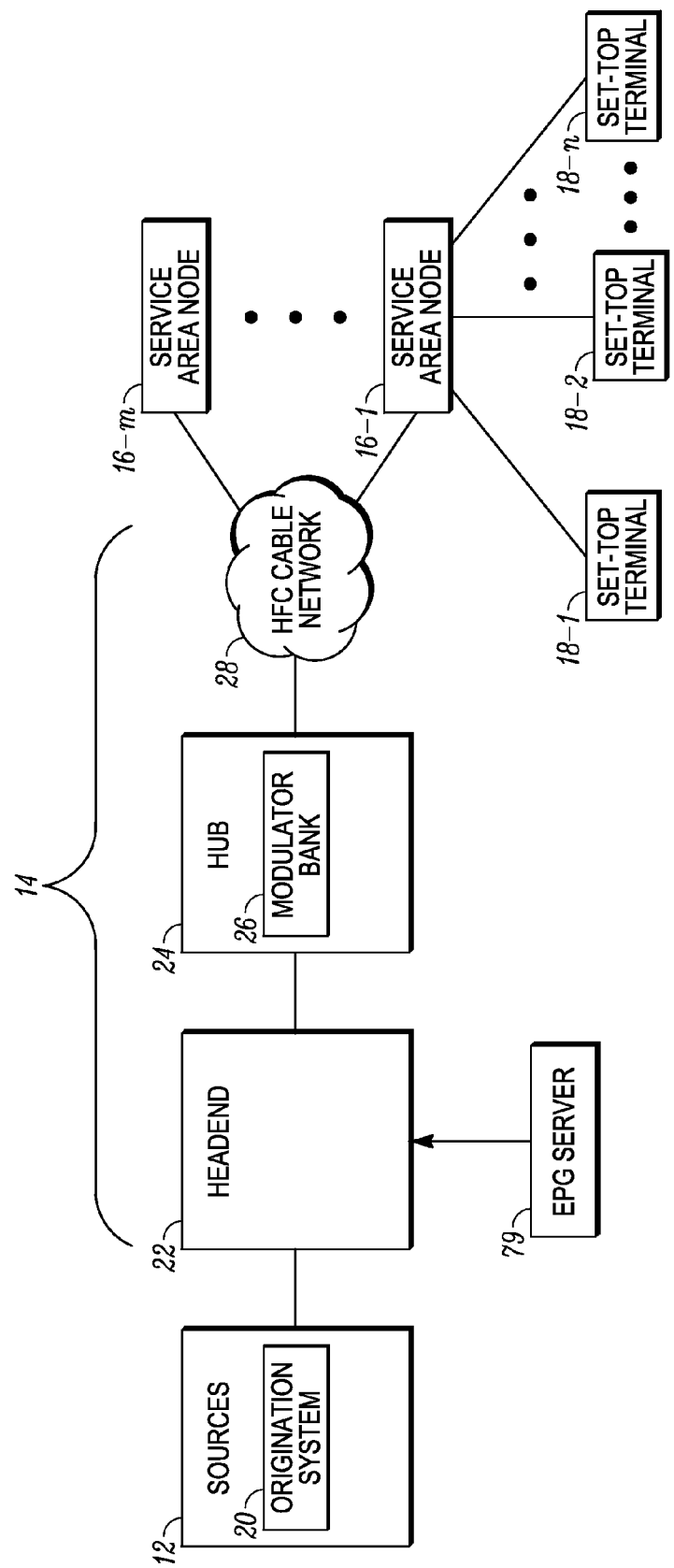
FIG. 1 is a block diagram of certain components of a broadband communications system in accordance with embodiments of the disclosure.
Figure 6:
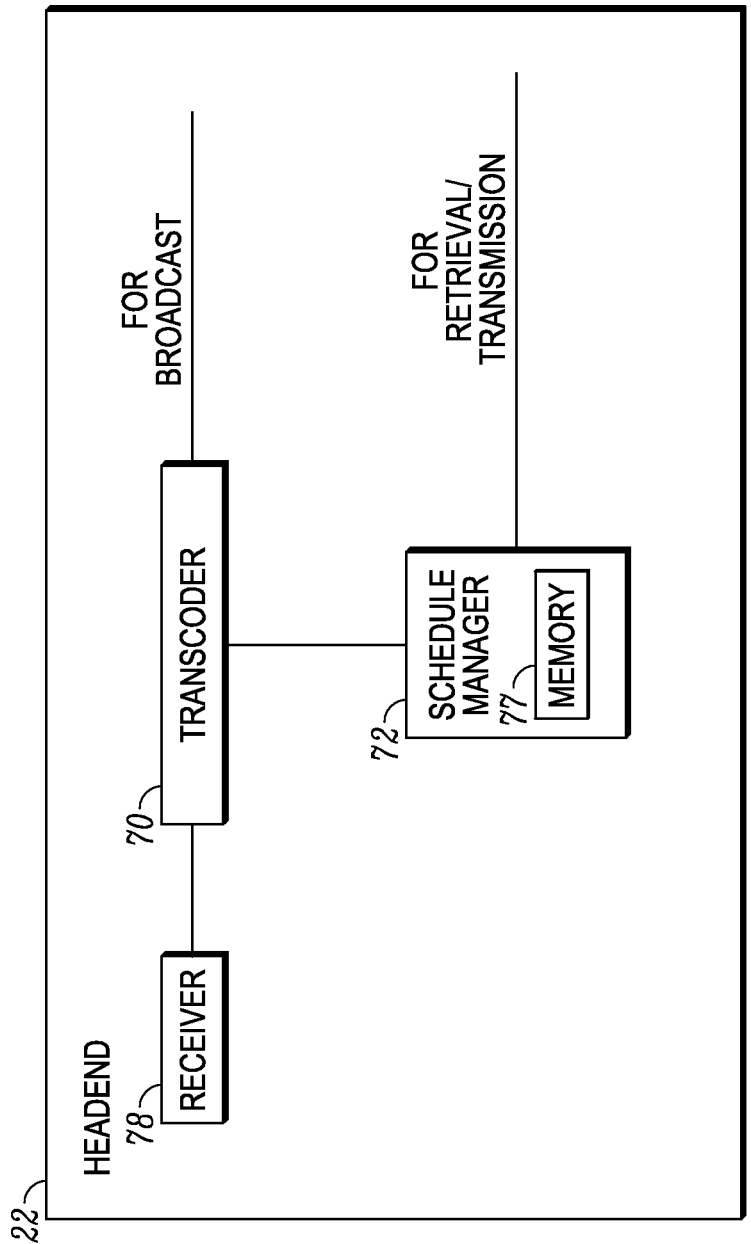

FIG. 6 is a block diagram of an example of a head-end of the cable system of FIG. 1

Figure 7:
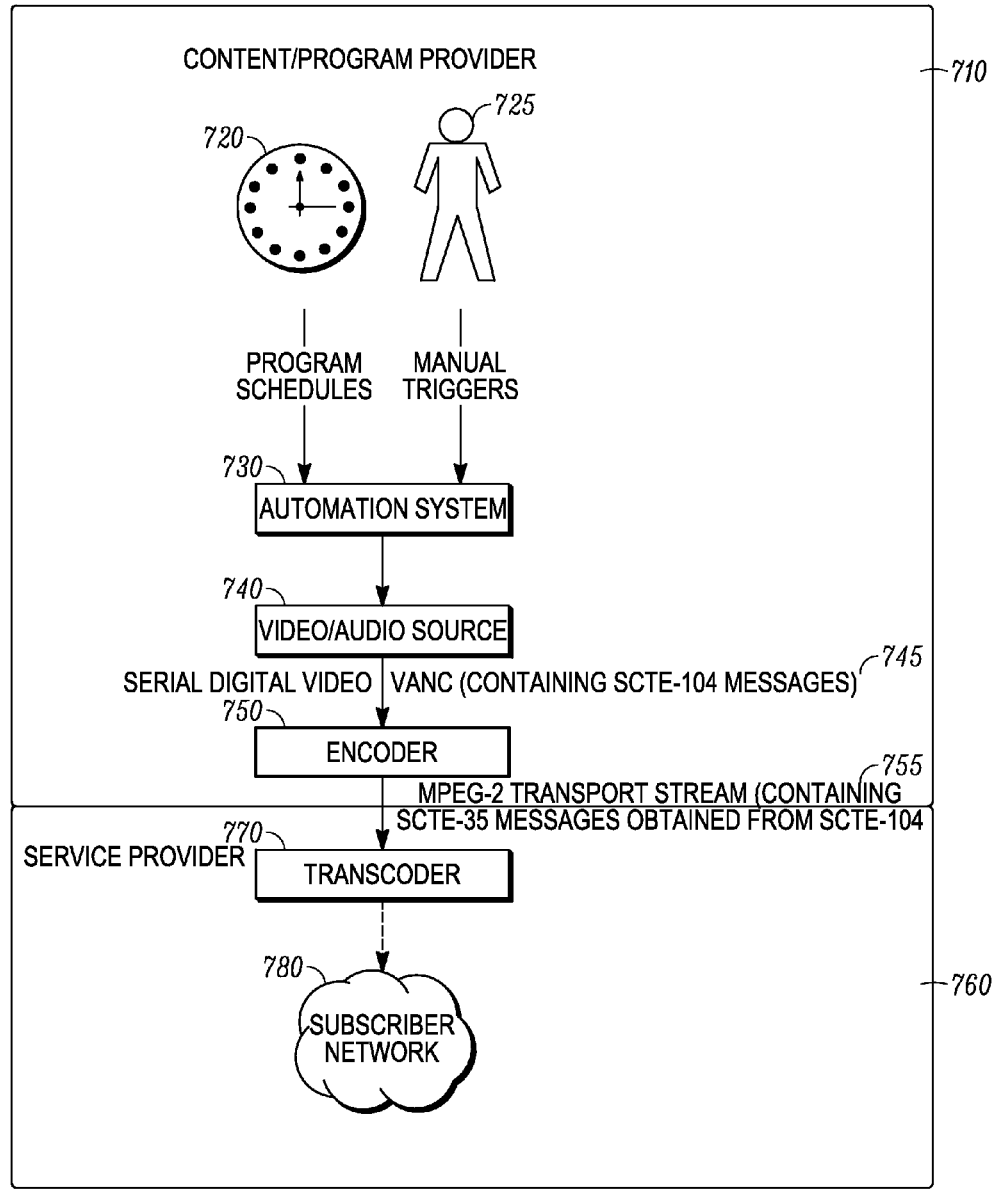

FIG. 7 is a block diagram of a system that shows the flow of content from a content/program provider to a service provider in accordance with embodiments of the disclosure.

Figure 8:
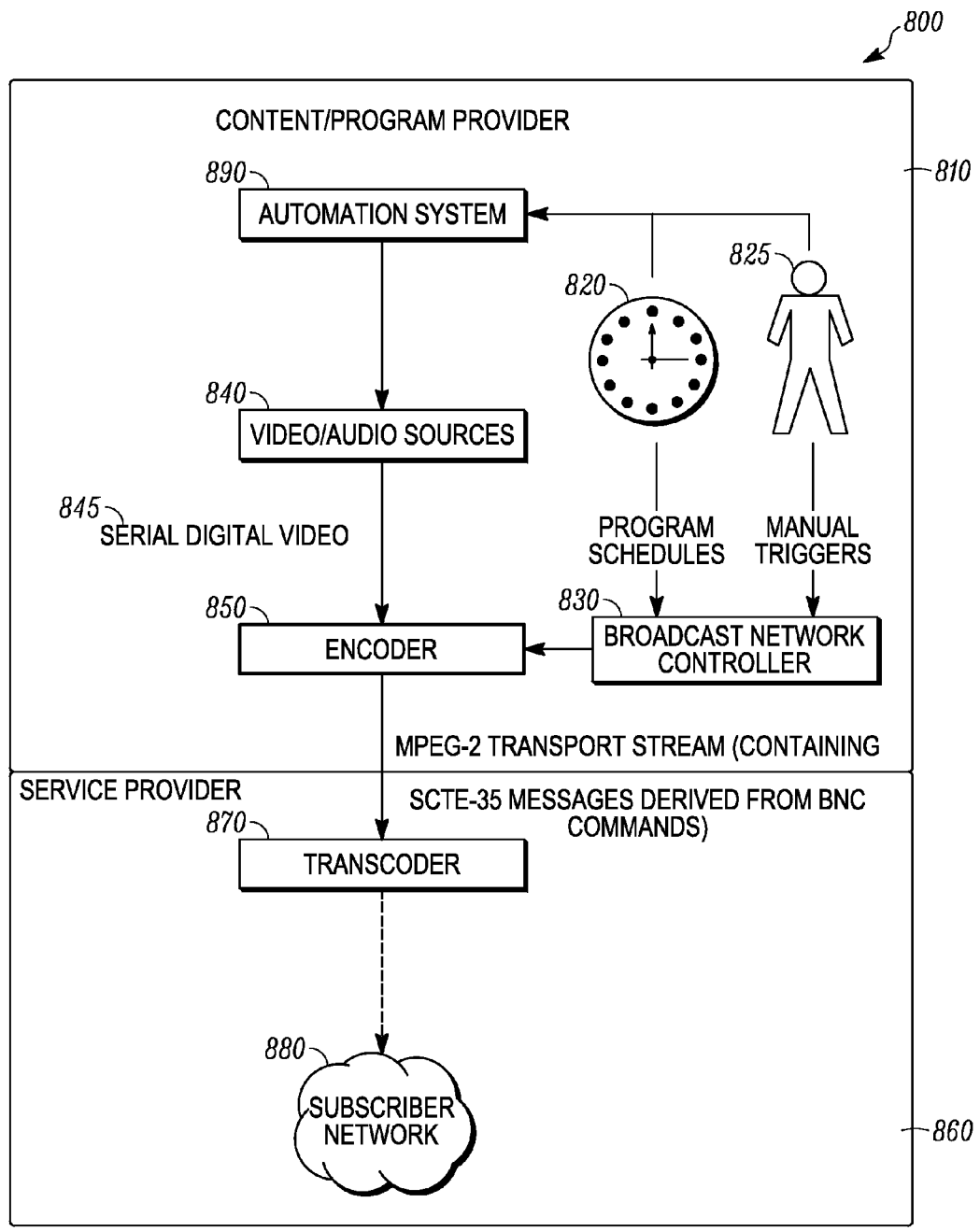

FIG. 8 is a block diagram of a system that shows the flow of content from a content/program provider to a service provider in accordance with embodiments of the disclosure.

Figure 9:
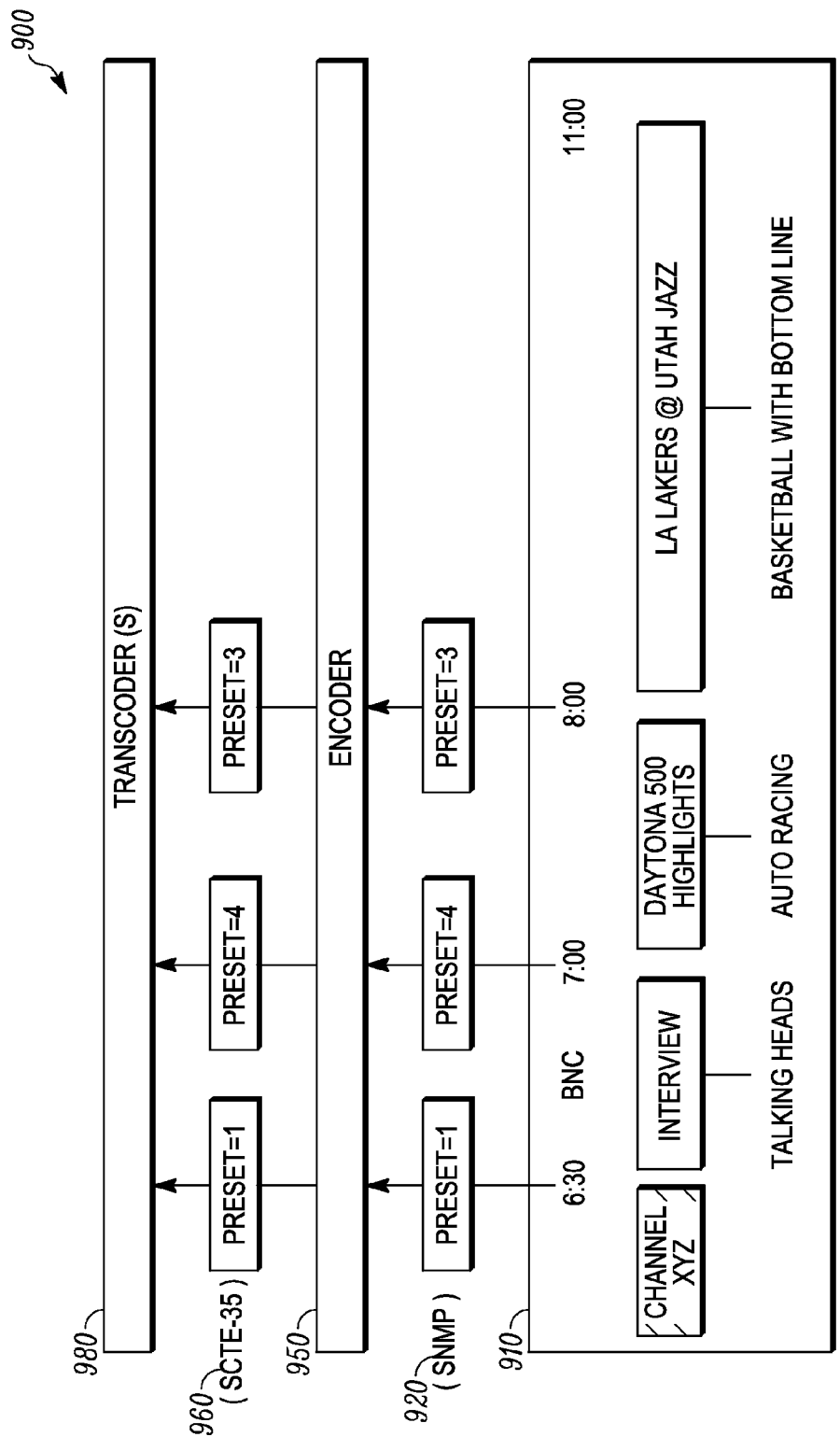

FIG. 9 is an example of a system that shows the flow of content from a Broadcast Network Controller (BNC) to an encoder and transcoder in accordance with embodiments of the disclosure.

BRIEF SUMMARY

Accordingly, there is provided herein systems and methods that allow program/content providers to modify encoder and/or transcoder video processing parameters in real-time, where the video processing parameters are optimized based on the type of content being compressed.

In a first aspect, a method of providing preset video processor configuration information in a video program stream is disclosed, the method comprising: identifying event boundaries of a video program; classifying the video program as an event type based on program title; selecting a preset from a list of at least two video processor configuration information presets for the event type; encoding the video program according to the specified preset value; and delivering the program stream to one or more subscribers. In an embodiment of the first aspect, the method further comprises: entering the selected preset processor configuration information into the program stream, wherein the program stream is an uncompressed video signal or a compressed video stream. In an embodiment of the first aspect, the selected preset processor configuration information is entered into the program stream from an automation system. In an embodiment of the first aspect, the selected preset processor configuration information is entered into the program stream using SCTE-104. In an embodiment of the first aspect, the selected preset processor configuration information is selected using an out-of-band signal. In an embodiment of the first aspect, the selected preset processor configuration information is entered into the out-of-band signal using simple network management protocol (SNMP) or hypertext transfer protocol (HTTP). In an embodiment of the first aspect, the list of at least two video processor configuration information presets is provided as a pull-down menu. In an embodiment of the first aspect, the list of at least two video processor configuration information presets includes a value and a descriptive term associated with the value. In an embodiment of the first aspect, the descriptive term is used to determine which preset to select for the event type. In an embodiment of the first aspect, the processor configuration information is stored in a look-up table. In an embodiment of the first aspect, the processor configuration information includes at least one of the following parameters: 3D noise reduction level, adaptive detail preservation level, motion-compensated temporal filter level, active picture location(s), overlay graphics locations, statistical multiplex weight, and combinations thereof.

In a second aspect, an apparatus for providing preset video processor configuration information in a video program stream is disclosed, the apparatus comprising a video coder configured to: receive identified event boundaries of a video program; receive a classified event type for the video program based on program title; receive a selected preset for video processor configuration information from a list of at least two video processor configuration information presets for the event type; and encode the program stream according to the selected preset processor configuration information. In an embodiment of the second aspect, the video coder receives the selected preset for video processor configuration information from an automation system. In an embodiment of the second aspect, the video coder receives the selected preset for video processor configuration information from an encoder controller. In an embodiment of the second aspect, the encoder controller is a broadcast network controller (BNC). In an embodiment of the second aspect, the video coder is further configured to: provide the encoded program stream to one or more transcoders. In an embodiment of the second aspect, the processor configuration information includes at least one of the following parameters: 3D noise reduction level, adaptive detail preservation level, motion-compensated temporal filter level, active picture location(s), overlay graphics locations, statistical multiplex weight, and combinations thereof. In an embodiment of the second aspect, the video coder comprises a video decoder configured to decode the program stream according to the selected preset processor configuration information. In an embodiment of the second aspect, the apparatus comprises at least one of: an integrated circuit; a microprocessor; and a wireless communication device that includes the video decoder. In an embodiment of the second aspect, the apparatus comprises at least one of: an integrated circuit; a microprocessor; and a wireless communication device that includes the video coder.

DETAILED DESCRIPTION

Reference will now be made in detail to implementations of the present disclosure. Each example is provided by way of explanation of the disclosure only, not as a limitation of the disclosure. It will be apparent to those skilled in the art that various modifications and variations can be made in the present disclosure without departing from the scope or spirit of the disclosure. For instance, features described as part of one implementation can be used on another implementation to yield a still further implementation. Thus, it is intended that the present disclosure cover such modifications and variations that come within the scope of the disclosure.

FIG. 1 is a block diagram of certain components of a broadband communications system 10 embodying principles of the disclosure. The system 10 may include one or more program sources 12, cable system 14 and a plurality of service area nodes 16-1 through 16-m in a neighborhood. Service area node 16-1, for example, is coupled to set-top terminals 18-1 through 18-n, located at customer premises. Cable system 14 may be configured to deliver information and entertainment services to set-top terminals 18-1 through 18-n.

Sources 12 may be configured to create and broadcast programming to cable system 14 through an origination system 20. Sources 12 may include analog and digital satellite video sources that typically provide the traditional forms of television broadcast programs and information services. Sources 12 may also include terrestrial broadcasters, such as broadcast networks (CBS, NBC, ABC, etc., for example), which typically transmit content from one ground antenna to another ground antenna and/or via cable. Sources 12 may also include application servers, which typically provide executable code and data for application specific services such as database services, network management services, transactional electronic commerce services, system administration console services, application specific services (such as stock ticker, sports ticker, weather and interactive program guide data), resource management service, connection management services, subscriber care services, billing services, operation system services, and object management services; and media servers, which provide time-critical media assets such as uncompressed or Moving Pictures Experts Group 2 or 4 ("MPEG-2" or "MPEG-4") standard encoded video and audio, encoded still images, bit-mapped graphic images, PCM or compressed digital audio, three dimensional graphic objects, application programs, application data files, etc. Although specific examples of programs and services which may be provided by the aforementioned sources are given herein, other programs and services may also be provided by these or other sources without departing from the spirit and scope of the disclosure.

Cable system 14 includes head-end 22, which may be configured to process program materials, such as TV program streams, for example, from sources 12. Digital TV streams may be formatted according to Motorola Digicipher System, Scientific Atlanta Powerview Systems, the Digital Satellite System (DSS), Digital Broadcast Services (DBS), or Advanced Television Standards Committee (ATSC) standards, for example. Head-end 22 may be configured to extract program content and reformat the content to form one or more MPEG-2 transport streams for transmission to users at set-top terminals 18-1 through 18-n. Such reformatting may be applied to those received streams already in an MPEG-2 transport format.

The generated program signal transport streams are typically transmitted from head-end 22 to hub 24 via Internet Protocol ("IP") transport over optical fiber. The program signal streams may also be transmitted as intermediate frequency signals that have been amplitude modulated ("AM") or as a digital video broadcast (DVB) asynchronous serial interface (ASI) signals. Hub 24 may include modulator bank 26, among other components. Modulator bank 26 may include multiple modulators, each of which may be configured to modulate transport streams onto different carriers. Hub 24 may be connected to hybrid fiber/coax (HFC) cable network 28, which may be connected to service area nodes 16-1 through 16-m. The transport streams may be recorded in head-end 22 so that the users at the set-top terminals may manipulate (e.g., pause, fast-forward or rewind) the programming content in the recorded streams. In some embodiments, the program signal streams may be processed and stored by head-end 22.

Figure 2:
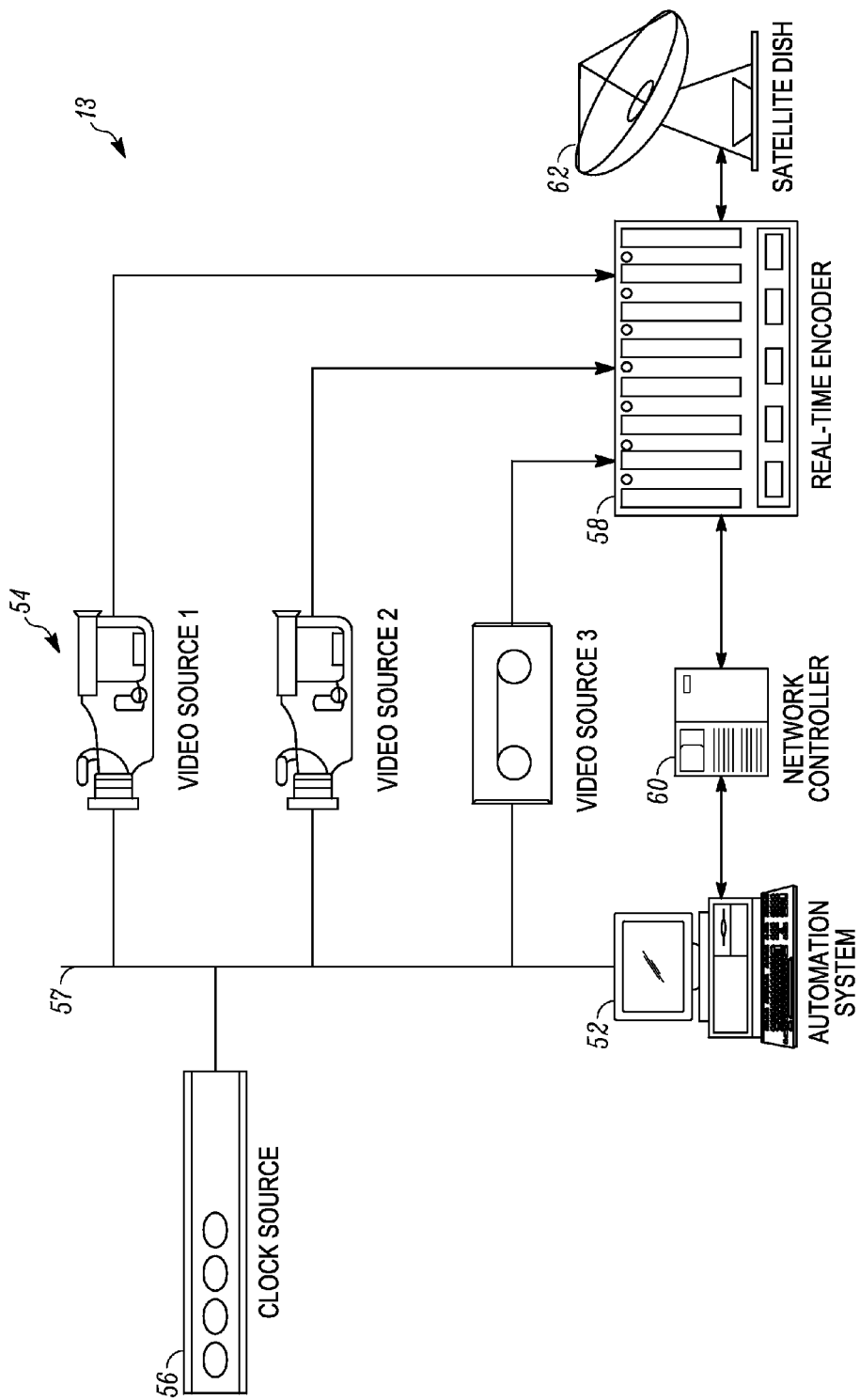
FIG. 2 is a block diagram of an example of an origination system of a source of programming of FIG. 1.

FIG. 2 is a block diagram of an example of an origination system 20 of a source 12. Origination system 13 may include automation system 52, which may be configured to control operation of system 13. Video sources 54, such as Video Source 1, Video Source 2 and Video Source 3, may be coupled to automation system 52 through data bus 57. Video sources 54 may provide program signal streams to automation system 52. Clock source 56 may also be coupled to data bus 57, to provide timing for system 13. Encoder 58 may be a real-time encoder coupled to video sources 54 to receive and encode the video streams into an MPEG-2 transport stream, for example. Network controller 60 may be a control and management interface to encoder 58 and an interface to automation system 52. Transmitter 62, such as a satellite dish, may be coupled to encoder 58 and act as an interface to transmit the program signal transport stream.

It can be appreciated that broadcasters naturally want to build quality assurance into the product they send their customers. Such quality assurance is difficult, especially when video streams originate in a variety of different formats (e.g., analog composite (NTSC/PAL), digital uncompressed (SD- SDI/HD-SDI), digital compressed (MPEG-2, MPEG-4, JPEG2000)). Furthermore, various transmission channels have quite different degradation characteristics. Experts in video quality analysis and standardization communities have been and currently are grappling with this problem by assessing various methods of digital video quality assessment and correction in order to standardize quality measurement.

Specifically, a number of problems exist in the regime of video quality analysis or measurement and the fundamental technique of video quality analysis with regard to digital video. One example in terms of digital video is what viewers often receive from a dish network, such as provided by Echostar Satellite or DIRECTV. Digital video is also what viewers typically see when working with a computer to, for example, view Internet streaming and other video over the Internet. Other examples of digital video include QUICKTIME movies, supported by Apple Computer, Inc, AVI movies in Windows, and video played by a Windows media player. Another important example of digital video is high definition television (HDTV). HDTV requires a substantially greater amount of bandwidth than analog television due to the high data volume of the image stream.

Degradation in digital video can be especially problemsome because the degradation passes directly onto the viewer. For example, noise may have been introduced in a video stream that causes the original picture to be disturbed. There are various types of noises, and the particular type of noise can be critical.

Examples of various types of noise include the following. In one type of digital noise, the viewer sees "halos" around the heads of images of people. This type of noise is referred to as "mosquito noise." Another type of noise is a motion compensation noise that often appears, for example, around the lips of images of people. With this type of noise, to the viewer, the lips appear to "quiver."

The general transmittal of data for digital broadcasts for digital viewing produces output that is greatly reduced in size from the original HDTV digital broadcast, in terms of the amount of data transferred. Typically, this reduction in data occurs as a result of compression of the data, such as occurs with a process called moving pictures expert group (MPEG) conversion or otherwise via lossy data compression schemes known in the art. The compression process selectively transfers data, reducing the transmittal of information among frames containing similar images, and thus greatly improving transmission speed. Generally, the data in common among these frames is transferred once, and the repetitive data for subsequent similar frames is not transferred again. Meanwhile, the changing data in the frames continues to be transmitted. Some of the noise results from the recombination of the continually transferred changing data and reused repetitive data.

For example, when a news broadcaster is speaking, the broadcaster's body may not move, but the lips and face may continuously change. The portions of the broadcaster's body, as well as the background behind the broadcaster on the set, which are not changing from frame to frame, may only be transmitted once as a result of the compression routine. The continuously changing facial information however, may be constantly transmitted. Because the facial information represents only a small portion of the screen being viewed, the amount of information transmitted from frame to frame can be much smaller than would be required for transmission of the entire frame for each image. As a result, among other advantages, the transmission rate for such broadcasts is greatly increased from less use of bandwidth.

As can be seen from the above example, one type of the changing data that MPEG continuously identifies for transfer is data for motion occurring among frames, an important part of the transferred video. For video quality purposes, accurate detection of motion is important. Inaccuracies in identification of such motion, however, lead to subjective image quality degradation, such as lip "quivering" seen in such broadcasts.

Currently, optimization of compressed video quality requires detailed, sophisticated analysis and processing of content encoded by an encoder. For example, currently, the encoder manufacturer/vendor and/or the program/content provider establish a specific encoder configuration setting that is optimized across all types and genres of content expected to be encoded and broadcast by the provider. However, this setting may not be optimal for each individual program, thereby consuming unnecessary bandwidth if the compression is not aggressive enough or resulting in degraded picture quality if the compression is too aggressive.

The use of dynamic, provider-specified information about the content being encoded may provide assistance in optimization. For example, allowing a programmer to provide control signals to an encoder to optimize settings for specific content may result in added compression efficiencies. Such control signals may be provided in the form of preset video processing configurations that e.g., a broadcast programmer may select from when assembling a program schedule.

In some embodiments, the video source itself may include the preset configurations. For example, the video may include a preset configuration value or set of instructions in the vertical ancillary (VANC) data space of a serial digital (SDI) video input to the encoder. In another embodiment, the preset value or configuration instructions may be provided in the compressed bitstream, e.g., delivered via a dedicated packet (e.g., packet identifier (PID)) stream in an MPEG-2 compliant transport stream. More discussion on in-band signaling is provided below.

Figure 3:
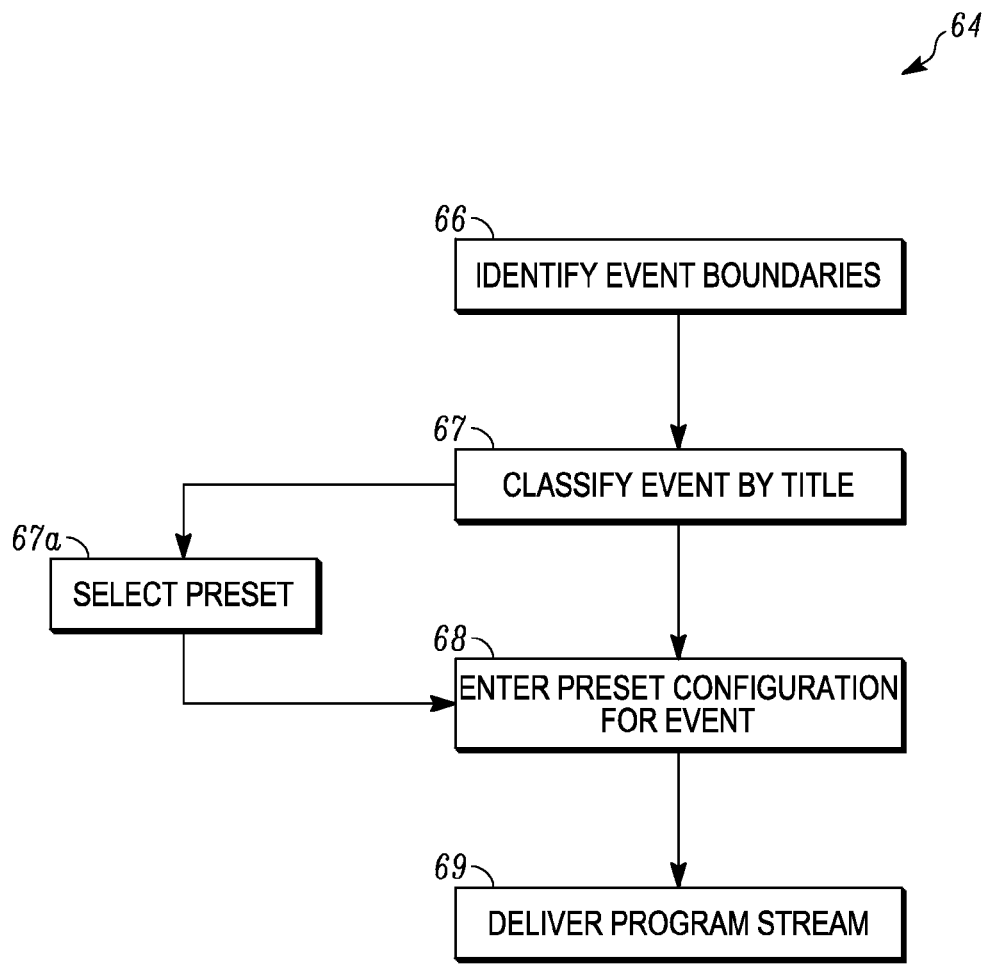
FIG. 3 is an example of a method of preparing a program signal stream for delivery by the origination system of FIG. 2.

FIG. 3 is an example of a process 64 of preparing a program stream for delivery in accordance with an embodiment of the disclosure. Event boundaries are identified in Step 66. For example, automation system 52 may include a display, e.g. a graphic user interface (GUI), and a keyboard (not shown) through which an operator or programmer may view a program and identify the start and end of program and the start and end of program portions of interest (e.g., interstitials), by demarcations. The positions of the demarcations may be defined with respect to clock 56.

Figure 4:
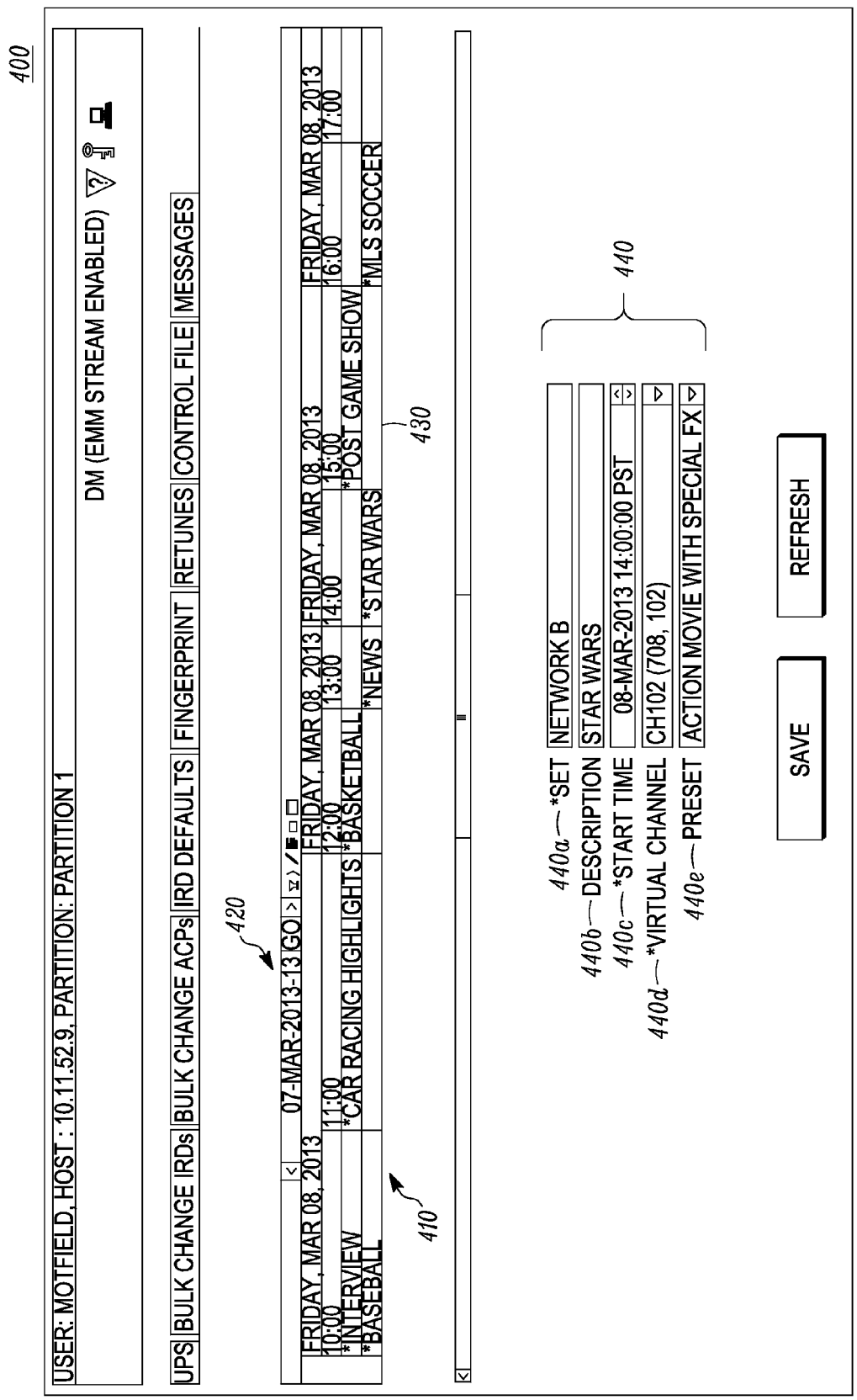
FIG. 4 is an example graphic user interface (GUI) that may be used to schedule an electronic program guide (EPG) in accordance with embodiments of the disclosure.

An example GUI screenshot 400 is shown in FIG. 4, where the GUI is an interface for scheduling events into time slots (e.g., as part of the EPG) that a programmer may regularly utilize. The GUI screenshot 400 includes a schedule of events for each channel as indicated by reference numeral 410 that the programmer may view by selecting a day in a date field 420. As shown in FIG. 4, the programmer has selected to review the information for channel 102 (CH102), as indicated by reference numeral 430.

In some embodiments, upon selecting (e.g., by clicking on) the channel at a particular timeslot, an information box 440 having a plurality of information fields 440a, 440b, 440c, 440d and 440 is presented the programmer. As shown in the present example, information box includes the following information fields—set 440a relates to which network the program is being provided by, description 440b relates to a general title of the program, start time 440c relates to the time the program begins, virtual channel 440d relates to the channel the program is being shown on, and preset 440e relates to the preset selected for video compression processing parameters. While shown as a plurality of drop-down menus, information fields 440*a-e* may be presented in any user-friendly format. Also, while five information fields 440*a-e* are shown, any number of information fields may be used as part of the GUI.

The event is thereafter classified in Step 67. For example, the programmer may enter in the title of the event into the GUI of FIG. 4. The title may be descriptive, such as "Daytona 500 Highlights" or "Interview." The classification of the event may be a general concept of event type such as "sports" or "soap opera", where the video quality can have a noticeable impact on the programs. In some embodiments, the GUI is pre-populated, such as with default information programmed into the controller software, and the programmer only needs to enter a portion of the events into the GUI, such as local channel information.

After the programmer determines what type of event is slotted in the GUI, the programmer may select from a preset menu or list, a preset video processor configuration in Step 67*a*. For example, the preset menu or list may comprise a drop-down menu having a number of presets and the associated content genre.

The programmer enters the preset configuration for the event in Step 68. In some embodiments, the preset configurations comprise numerical values that have also been pre-programmed or preconfigured in the encoder, each representing a unique video processing configuration. A descriptive label may also be provided for each preset, aiding operator interpretation of each option. In some embodiments, the preset configuration is selected and/or enacted in real-time. It should be appreciated that while Steps 67*a* and 68 are shown separately, in some embodiments they may comprise a single step.

Table 1 shows a number of example presets and their associated content genre.

TABLE 1

| Preset | Content Genre |
| --- | --- |
| 1 | Talking Heads |
| 2 | Basketball |
| 3 | Basketball w/bottom line graphics |
| 4 | Auto Racing |
| 5 | Low Action Film |
| 6 | ... |
| ... | ... |

In some embodiments, the preset configuration information is selected as a numerical value that corresponds to a look-up table having the processing configuration information or instructions stored. Each preset may include, but is not limited to, any combination of the following parameter settings: 3D noise reduction level, adaptive detail preservation level, motion-compensated temporal filter level, active picture location(s), overlay graphics locations (e.g., text crawls, bugs, etc.), statistical multiplex weight, etc.

In some embodiments, automation system 52 translates the preset video processing configurations selected by the programmer into video processing configuration commands, which may be sent to network controller 60 via an IP connection. Network controller 60 may send the video processing configuration commands, which includes the video processing configuration to be applied, to encoder 58. Encoder 58 may be configured to format the command into an MPEG-2 transport packet, for example, and insert the packet into the transport stream at the specified clock time. In another embodiment, automation system 52 sends video processing configuration commands to the video source equipment 54 via an IP connection for insertion into the video signal, e.g., using vertical ancillary data (VANC) in a serial digital video stream delivered to encoder 58.

In such embodiments, e.g., from automation system 52, the preset selection may be provided by in-band signaling. The in-band signaling may be included by the source itself (e.g., using SCTE-104), as commanded by the automation system.

For example, FIG. 5 shows an example message format for in-band signaling using SCTE-104. One possible implementation of an SCTE-104 message is shown at 500. In this case, the standard supports the delivery of a "proprietary_command_request_data" command 510 as part of the SCTE-104 message syntax. In addition to processing the private data contained therein—in this case, a video_preset_ID 520—and configuring its compression engine settings accordingly, this value may also be conveyed to downstream equipment by translating 530 from SCTE-104 to SCTE-35 syntax as shown—as private_command(video_preset_ID) 540. In some embodiments, downstream devices may be configured to detect the presence of this command 540 and act upon it if the specified preset corresponds to a preset configuration.

In some embodiments, the preset configurations may be provided as out-of-band or external commands. Such out-of-band signaling may be provided to an encoder from an e.g., simple network management protocol (SNMP) or hypertext transfer protocol (HTTP) from an Element Management System. For example, the encoder may support an SNMP Management Interface Base (MIB) object used to specify an integer value representing the preset selection. A management system (e.g., BNC) would employ this object to select the desired video processing configuration for each program event. Similarly, preset instructions could be delivered from the management system to an encoder via an HTTP connection using, for example, the extensible markup language (XML) to convey those instructions.

FIG. 6 shows certain components of an example of head-end 22 of cable system 14. Head-end 22 may include a Transcoder 70 and schedule manager 72. Schedule manager may include memory 77. Head-end 22 may be configured to receive programming from sources 12 via receiver 78, which couples the received program signal streams to Transcoder 70. Receiver 78 may comprise one or more satellite or terrestrial signal feeds, for example. Transcoder 70 may be configured to receive and process program streams for broadcast to service area nodes 16-1 through 16-*m* via hub 24 and HFC cable network 28.

Referring now to FIG. 7, a system 700 that shows the flow of content from a content/program provider 710 to a service provider 760 is shown. In some embodiments, the content or program provider 710 supplies program schedule information 720 to an Automation System 730. This information 720 may include a description of each program event including start and end times, ad insertion schedules, etc. In order to take advantage of the benefits proposed by this disclosure, the schedule information 720 may also include prescribed encoder configuration settings (e.g., "presets") that an operator or external source determines as most appropriate for the content contained in each program. In some embodiments, manual triggers 725 may also be conveyed to the Automation System 730 when the scheduled programming is actually aired. In some embodiments, manual triggers 725 may be used to accommodate late (or early) starts due to weather (e.g., a rain-delayed sports event), unplanned interruptions (e.g., breaking news), etc.

In some embodiments, Automation System 730 is configured to manage the Video/Audio Sources 740 according to the program schedule and associated ad breaks, routing signals as appropriate. In some embodiments, encoder preset information may be delivered and embedded as control information intended for the Encoder 750. In one implementation, this preset information may be included as "private" data and conveyed per the SCTE-104 protocol as shown as data flow 745. Other vertical ancillary data (VANC)-based schemes are contemplated. For example, any scheme that enables delivery of data along with video and audio supplied to an encoder via a serial digital interface (SDI) may be used. Typically VANC is used to carry Closed Captioning but it may carry other standard and proprietary data for encoder processing.

In some embodiments, the Encoder 750 receives an SDI input and processes the data contained therein, including preset information. The Encoder 750 may configure its video compression engine according to the parameters established a priori for the specified preset value. For example, preset 3 might be interpreted as follows by the encoder:

Deblocking filter enabled
Alpha offset=−1
Beta offset=2
PVP enabled
3D Noise Reduction filter strength="medium"
Adaptive Detail Preservation Filter="passthrough"

In some embodiments, the Encoder 750 output includes an SCTE-35-compliant message containing the preset command intended for downstream transcoders 770 (or encoders), shown as MPEG-2 Transport Stream 755. It may repeat this message periodically to guarantee reception. In some embodiments, this message is included in the video/audio multiplex as a separate PID stream.

Transcoders 770 may configure their compression engines according to the specified preset number. In some embodiments, transcoder 770 has been pre-configured (e.g., by service provider) to translate each preset into a specific video processing configuration and ignore unknown presets, defaulting to some, possibly non-optimal, setting. Lastly, the compressed video is provided to Subscriber Network 780.

Referring now to FIG. 8, a system 800 that shows the flow of content from a content/program provider 810 to a service provider 860 is shown. In some embodiments, the content or program provider 810 supplies program schedule information 820 to an encoder controller, shown as a Broadcast Network Controller (BNC) 830. In some embodiments, manual triggers 825 may also be conveyed to the Broadcast Network Controller 830 when the scheduled programming is actually aired. Program schedule information 820 and manual triggers 825 may also be conveyed to an Automation System 890, but in this embodiment the information is intended for traditional usage, e.g., excluding encoder video preset configuration command data.

In some embodiments, Automation System 890 is configured to manage the Video/Audio Sources 840 according to the program schedule and associated ad breaks, routing signals as appropriate.

In some embodiments, the interface to the encoder 850 may be configured to employ a protocol like SNMP, but other methods are contemplated (e.g., XML over HTTP). Thus, the encoder 850 may be configured to receive encoder preset information from the Broadcast Network Controller 830. The appropriate information is transferred to transcoder 870 which encodes the video according to the specified preset and delivers it to the Subscriber Network 880.

Referring now to FIG. 9, a system 900 that shows the flow of video encoding configuration commands from a Broadcast Network Controller (BNC) 910 to an Encoder 950 and to a Transcoder 980 is shown. As described above with respect to the GUI of FIG. 5, an operator may schedule each e.g., television channel (shown here as Channel XYZ) with a series of programs at certain times. In selecting or slotting the program for each time slot, the operator may select a preset to go with the particular program. For example, the Interview at 6:30 may be classified as "Talking Heads" by the GUI and assigned a Preset=1 at the Encoder and Transcoder. The Daytona 500 Highlights at 7:00 may be classified as "Auto Racing" and assigned a Preset=4. The LA Lakers @ Utah Jazz at 8:00 may be classified as "Basketball with bottom line" and assigned a Preset=3.

From FIG. 9, it should be clear that as program information is sent from the BNC 910 to Encoder 950 (e.g., using SNMP 920), and from Encoder 950 to Transcoder 980 (e.g., using SCTE-35), the preset information is also sent.

Benefits realized by the present disclosure may include one or more of the following: (1) support the use of preset video processor configurations (each of which may be optimized for a particular content genre/format) selected in real-time or scheduled by the program/content provider; (2) support the preset selection through an encoder/transcoder control system (e.g., Motorola Broadcast Network Controller (BNC)) by allowing the operator to specify a preset schedule; (3) support dynamic preset selection through a protocol (e.g., SCTE-104) allowing a program provider to specify presets in-band (e.g., HD-SDI VANC) to an encoder (e.g., using an automation system); (4) support the delivery of preset commands to downstream encoders/transcoders using a protocol (e.g., SCTE-35).

Additionally, using preset values instead of describing individual processor settings may support the inter-operation of equipment from multiple vendors. For example, not all vendors support the same palette of encoder settings. An operator using equipment from Vendor A and Vendor B may want to employ the same preset value for a particular content genre. The present disclosure may allow such universal use of presets.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method of providing preset video processor configuration information in a video program stream, the method comprising:

identifying event boundaries of a video program;
classifying the video program as an event type based on program title;
selecting a preset from a list of at least two video processor configuration information presets based on the event type, wherein the selected preset identifies an encoding technique for the video processor that is particular to the event type, and wherein the encoding technique provides optimal video compression efficiency by selection of the encoding technique for the preset based on a knowledge of how to best compress the video program based on an assessment of encoding specific image quality characteristics of a same or similar program content;

encoding the video program according to the selected preset to form a compressed video stream; and delivering the program stream to one or more subscribers.

2. The method of claim 1, wherein the selected preset provides for a different processor configuration to encode the video based on the event type, wherein the event type includes at least two of the following: an auto race, a basketball game, a baseball game, a football game, a soccer game, announcers speaking as talking heads, a television drama, a movie, a reality show, and a background scene for display during music audio play.

3. The method of claim 1, wherein the selected preset processor configuration information is entered into the program stream using SCTE-104.

4. The method of claim 1, wherein the selected preset processor configuration information is selected using an out-of-band signal.

5. The method of claim 1, wherein the selected preset processor configuration information is entered into the out-of-band signal using simple network management protocol (SNMP) or hypertext transfer protocol (HTTP).

6. The method of claim 1, wherein the list of at least two video processor configuration information presets is provided as a pull-down menu.

7. The method of claim 1, wherein the list of at least two video processor configuration presets include a value and a descriptive term associated with the value.

8. The method of claim 1, wherein the descriptive term is used to determine which preset to select for the event type.

9. The method of claim 1, wherein the processor configuration information is stored in a look-up table.

10. The method of claim 1, wherein the processor configuration information includes at least one of the following parameters: 3D noise reduction level, adaptive detail preservation level, motion-compensated temporal filter level, active picture location(s), overlay graphics locations, statistical multiplex weight, and combinations thereof.

11. An apparatus for providing preset video processor configuration information in a video program stream, the apparatus comprising a video coder configured to:

receive identified event boundaries of a video program;

receive a classified event type for the video program based on program title;

receive a selected preset for video processor configuration information from a list of at least two video processor configuration information presets based on the event type, wherein the selected preset identifies an encoding technique for the video processor that is particular to the event type, and wherein the encoding technique provides optimal video compression efficiency by selection of the encoding technique for the preset based on a knowledge of how to best compress the video program based on an assessment of encoding specific image quality characteristics of a same or similar program content; and encode the program stream according to the selected preset for the processor configuration information to form a compressed video stream.

12. The apparatus of claim 11, wherein the video coder receives the selected preset which provides for a different video processor configuration to encode the video based on the event type, wherein the event type includes at least two of the following: an auto race, a basketball game, a baseball game, a football game, a soccer game, announcers speaking as talking heads, a television drama, a movie, a reality show, and a background scene for display during music audio play.

13. The apparatus of claim 11, wherein the video coder receives the selected preset for video configuration information from an encoder controller.

14. The apparatus of claim 13, wherein the encoder controller is a broadcast network controller (BNC).

15. The apparatus of claim 11, wherein the video coder is further configured to:

provide the encoded program stream to one or more transcoders.

16. The apparatus of claim 11, wherein the processor configuration information includes at least one of the following parameters: 3D noise reduction level, adaptive detail preservation level, motion compensated temporal filter level, active picture location(s), overlay graphics locations, statistical multiplex weight, and combinations thereof.

17. The apparatus of claim 11, wherein the video coder comprises a video decoder configured to decode the program stream according to the selected preset processor configuration information.

18. The apparatus of claim 17, wherein the apparatus comprises at least one of:

an integrated circuit;

a microprocessor; and a wireless communication device that includes the video decoder.

* * * * *